Jan. 24, 1950     K. EGLI     2,495,368
THREAD CUTTING TOOLHOLDER
Filed Sept. 26, 1947
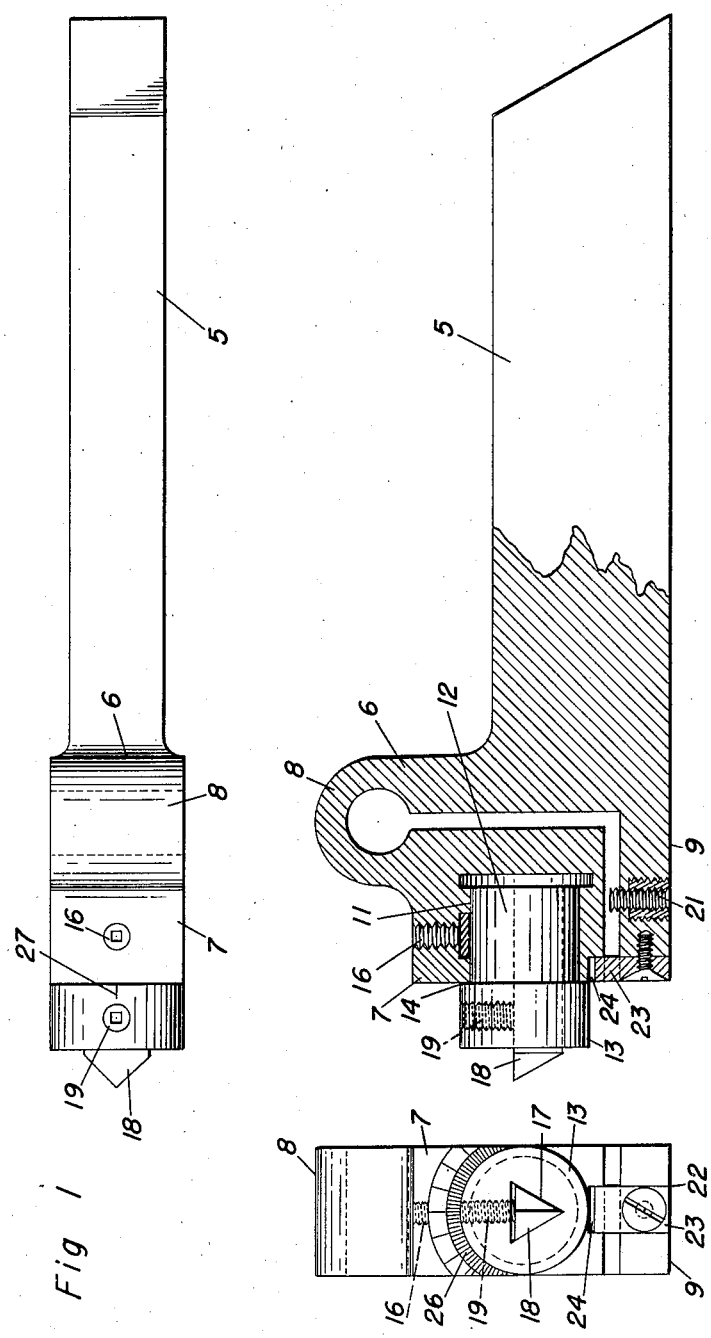
INVENTOR.
Karl Egli
BY
Att'y Patented Jan. 24, 1950

2,495,368

UNITED STATES PATENT OFFICE 2,495,368

THREAD-CUTTING TOOLHOLDER

Karl Egli, San Francisco, Calif.

Application September 26, 1947, Serial No. 776,328

1 Claim. (Cl. 29—97.5)

This invention relates to improvements in thread cutting tool holders, and has particular reference to a device for holding the cutting bit in an engine lathe whereby threads may be cut in a piece being worked upon.

The principal object of this invention is to provide a tool holder having a rigid shank and a spring mounted head within which the bit is rotatably positioned to accommodate for various angles.

A further object is to produce a holder wherein a V-shaped bit may be used which will save time in the grinding and sharpening of the bit.

A still further object of this invention is to provide a thread cutting holder which is readily adjustable for rough cutting as well as for the cutting of fine finishing cuts in which the adjustment may be made by a single set screw.

Another object is to produce a device of this character wherein the head may give slightly so as to prevent chattering.

A still further object of this invention is to produce a tool holder which is economical to manufacture, sturdy in construction and one which may be used in the ordinary tool post of an engine lathe without altering the construction of the lathe or the customary procedure in cutting of a thread.

Another object is to provide means whereby the nose of the bit may be rotated to any desired angle quickly through the use of a scale carried on the head, thus enabling the operator to change the angle of the bit at will and to reset the bit at a pre-determined angle without complicated maneuvers.

Other objects and advantages will be apparent during the course of the following description.

In the accompanying drawings forming a part of this specification and in which like numerals are employed to designate like parts throughout the same, Fig. 1 is a top plan view of my tool holder.

Fig. 2 is a side elevation of Fig. 1, and

Fig. 3 is an end elevation of Fig. 1 looking from the left of the drawing.

In the cutting of threads upon a piece of work such as a shaft or the like it is common practice to position the piece upon which the thread is to be cut in the chuck of a lathe, to rotate the same and to move thereagainst a sharpened bit, of especially treated steel, which is held in a tool holder, and by adjusting the tool holder, various angular positions of the bit may be achieved. These adjustments, however, are very crude and very fine adjustments cannot be made except by special grinding of the end of the bit to predetermined angles. Also, a rigid type of holder frequently causes a chattering of the tool due to the fact that the tool encounters hard and soft spots in the metal being worked upon and this chattering causes uneven cutting and consequently rough thread surfaces.

Applicant has, therefore, devised a tool holder wherein the bit is held in a slightly resilient head formed upon the tool holder, which head has a rotary sleeve positioned therein and in which the bit is held, thus allowing the bit to be turned on a horizontal axis to accomplish various degrees of cut without the necessity of especially beveling the edge of the cutting bit.

In the accompanying drawings wherein for the purpose of illustration is shown a preferred embodiment of my invention, the numeral 5 designates the shank of the tool, which shank has an upstanding portion 6, to which is integrally connected a head 7 by a resilient curved portion 8.

An extension 9 formed upon the shank 5 underlies the head 7, as shown in Figs. 2 and 3. This head 7 is provided with a horizontal bore 11 in which is mounted a sleeve 12 having an enlarged portion 13, which enlargement forms a shoulder 14 engaging the face of the head 7. This sleeve may be held against rotation in the head in any convenient manner as by a set screw 16.

Formed through the sleeve 12 is a tool holding recess 17 in which a bit 18 is positioned and held against movement by a set screw 19. It is, of course, understood that a square bit can be equally well used in a square hole formed in the sleeve 12.

An adjusting screw 21 extends through the extension 9 and has its end spaced from the bottom of the head. Thus, the head may move downwardly; however, the screw 21 limits the head from moving downwardly during a rough cut.

Formed in the face of the extension 9 is a slot 22 in which is positioned a lug 23 which extends upwardly into a slot 24 formed in the front face of the head 7. This lug prevents sidewise movement of the head 7 in either direction.

Formed upon the face of the head 7 are graduations 26 and formed upon the enlarged portion of the sleeve 12 is an alignment mark 27.

The result of this contruction is that when the parts are assembled, as shown in the figures, and the shank 5 is secured in the tool rest of a lathe, then the operator may loosen the set screw 16 and adjust the sleeve 12 through the medium of the aligning mark 27 and the graduations 26, so that the tip of the bit 18 may be turned to any desired angle with respect to a horizontal axis.

By now bringing the tool against the work and adjusting the screw upwardly until it engages the bottom of the head, rough cutting can be done, after which the screw 21 may be moved downwardly so as to provide a space between the screw and the head, thus permitting the head to flex downwardly through the curved connection 8 with the shank 5.

The result of this is that a very fine cut may take place, thus giving a mirror-like finish to the surface of the thread.

Sidewise movement in either direction is prevented by the lug 23, which extends upwardly into a slot 24 in the head 7.

It will thus be seen that my tool will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a thread cutting tool holder, a shank, a head formed integrally with said shank spaced therefrom through the medium of a curved resilient portion, a lug carried by said shank and engaging a slot formed in said head to prevent sidewise movement of said head with respect to said shank, said head having a bore formed therein, a sleeve adjustably positioned in said bore, means for securing a bit in said sleeve, and a limiting screw carried by said shank and engaging the under side of said head at a point remote from said resilient curved portion when making a rough cut.

KARL EGLI.

REFERENCES CITED

The following references are of record in the file of this patent:

UNITED STATES PATENTS

| Number | Name | Date |
|---|---|---|
| 895,611 | Avery | Aug. 11, 1908 |
| 1,415,578 | Knoop | May 9, 1922 |

FOREIGN PATENTS

| Number | Country | Date |
|---|---|---|
| 508,549 | France | Oct. 14, 1920 |